United States Patent [19]

Sogah et al.

[11] Patent Number: 4,544,724

[45] Date of Patent: Oct. 1, 1985

[54] SILYLATED VINYL ALCOHOL POLYMERS

[75] Inventors: Dotsevi Y. Sogah; Owen W. Webster, both of Wilmington, Del.

[73] Assignee: E. I. Du Pont de Nemours and Company, Wilmington, Del.

[21] Appl. No.: 622,115

[22] Filed: Jun. 19, 1984

[51] Int. Cl.$^4$ .............................................. C08G 77/16
[52] U.S. Cl. ....................................... 526/279; 528/10; 528/43
[58] Field of Search ....................... 526/279; 528/10, 43

[56] References Cited

U.S. PATENT DOCUMENTS

| | | | |
|---|---|---|---|
| 2,165,962 | 7/1939 | Mueller-Cunradi et al. | 260/615 |
| 3,418,293 | 12/1968 | Bolchert | 260/80 |
| 4,145,507 | 3/1979 | Wolfers et al. | 528/42 |
| 4,417,034 | 11/1983 | Webster | 526/194 |

FOREIGN PATENT DOCUMENTS

22299/69 1/1965 Japan .

OTHER PUBLICATIONS

Jung, et al., Tetrahedron Lett., 3791, (1977).
Murahashi, et al., Polymer Letters 3, 245, (1965) and 4, 59, 65 and 187, (1966).
Nozakura, et al., J. Polymer Sci., Polymer Chem. Ed., 11, 1053, (1973).
Runge, et al., Makromol. Chem., 120, (1968).
Colvin, "Silicon in Organic Synthesis", Butterworths, 1981, pp. 219–222, 227–236.
Hoaglin, et al., J. Am. Chem. Soc., 71, 3648, (1949).
Fishman, et al., Synthesis Comm., 137, (1981).

Primary Examiner—Paul R. Michl
Assistant Examiner—Alex H. Walker

[57] ABSTRACT

Silylated vinyl alcohol polymers and processes for their prepartion.

61 Claims, No Drawings

SILYLATED VINYL ALCOHOL POLYMERS

BACKGROUND OF THE INVENTION

1. Field of the Invention

This invention relates to silylated vinyl alcohol polymers, that is, polymers of ethenyloxysilanes, and to their preparation.

2. Background

Ethenyloxysilanes are known compounds or are prepared by known methods, for example, as described by Jung et al., Tetrahedron Lett., 3791 (1977); polymers prepared therefrom are also known. For example, U.S. Pat. No. 3,418,293 discloses the polymerization of vinyloxysilanes of the formula $CH_2=CHOSi(R^1)(R^2)(R^3)$ wherein $R^1$, $R^2$ and $R^3$ are the same or different, and each is a hydrocarbon radical which can include alkyl, cycloalkyl, aryl, aralkyl and alkaryl, in the presence of an ionic catalyst of the Friedel-Crafts or Ziegler type, at a temperature in the range −80° C. to 0° C., in an anhydrous organic solvent. The polymerization product is a poly[(ethenyloxy)triorganosilane] which can be converted to poly(vinyl alcohol) by alcoholysis. Other processes for polymerizing silanes, employing free radicals or compounds such as $SnCl_4$ or ethyl aluminum chlorides, but not aldehydes, as initiators, are disclosed in the art, for example, as follows.

Murahashi et al., Polymer Letters 3, 245 (1965) and 4, 59, 65 and 187 (1966), disclose the preparation of poly(vinyltrimethylsilyl ethers) by radical and cation-initiated polymerization of vinyloxy trimethylsilane and conversion thereof to stereoregular poly(vinyl alcohol). Also disclosed is the radical-initiated copolymerization of vinyloxy trimethylsilane ([ethenyloxy]trimethylsilane) with vinyl comonomers. Cationic initiators employed were $SnCl_4$ or ethyl aluminum chlorides. Nozakura et al., J. Polymer Sci., Polymer Chem. Ed., 11, 1053 (1973), disclose the polymerization of several ethenyloxy trialkylsilanes initiated by cationic compounds $SnCl_4$ or ethyl aluminum chlorides, and conversion of the poly(vinyltrialkylsilyl ethers) to poly(vinyl alcohol) with aqueous hydrofluoric acid. Runge et al., Makromol. Chem., 120, 148 (1968), disclose the free radical-initiated copolymerization of ethenyloxytrimethylsilane with vinyl comonomers. Japanese published, unexamined application JA 22299/69 discloses a process of copolymerizing ethenyloxytrialkylsilanes with vinyl comonomers in the presence of radical catalysts such as azo-bis(isobutyronitrile). Colvin, "Silicon in Organic Synthesis". Butterworths, 1981, pages 219–220, discloses the reaction of alicyclic silyl enol ethers with aldehydes in the presence of a fluoride ion catalyst, for example,

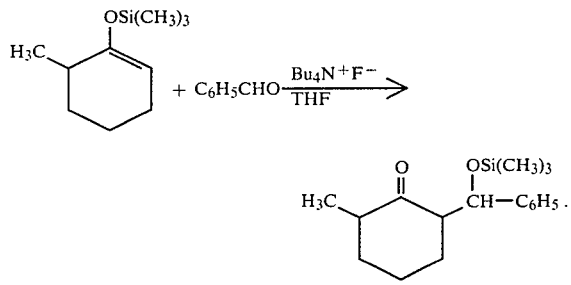

Colvin, ibid, page 227, discloses the reaction of aromatic aldehydes with silyl ketene acetals in the presence of $TiCl_4$; the silyl group in the product is subsequently removed by hydrolysis, for example,

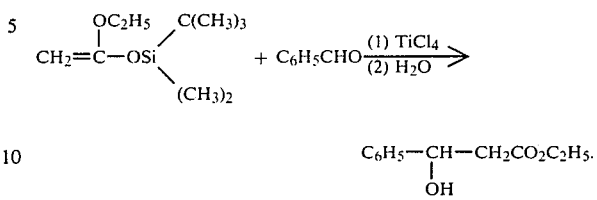

Colvin, ibid, pages 221 and 222, discloses the reaction of certain alkyl and aralkyl halides with silyl enol ethers in the presence of $TiCl_4$ or $ZnBr_2$, for example,

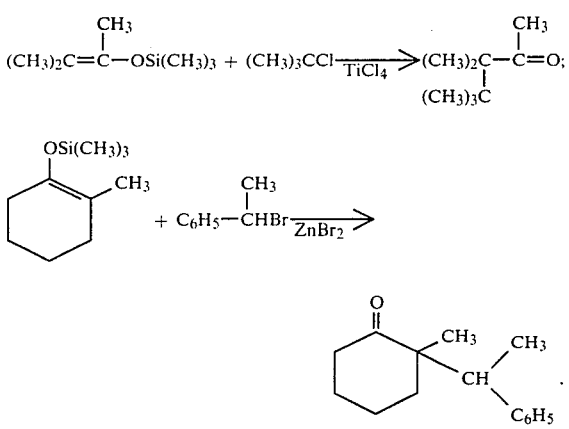

Colvin, ibid, pages 232–236, discloses the reaction of silyl enol ethers with acyl halides, halogenated acid anhydrides and ketones in the presence of Lewis acids.

The conversion of pendant siloxy groups, such as $-OSi(CH_3)_3$, to hydroxyl groups in polymers by a variety of methods is disclosed in the aforesaid publications of Murahashi and Colvin and in the Japanese publication.

U.S. Pat. No. 2,165,962 and Hoaglin et al., J. Am. Chem. Soc., 71, 3468 (1949) describe the polymerization of alkyl vinyl ethers in the presence of acetals such as acetaldehyde acetal and a Lewis acid such as $BF_3$ to form acetal-capped polyvinyl ethers; for example,

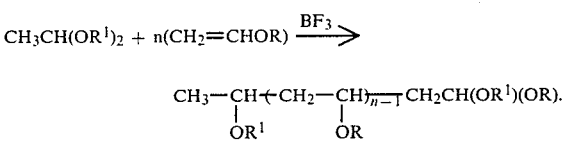

Acetal-initiated polymerization of trialkylsilylvinyl ethers is not disclosed. Formation of unsaturated aldehydes by hydrolysis of a 1,1,3-trialkoxy product formed by the condensation of an acetal with a vinyl ether is disclosed by Fishman et al., Synthesis Comm., 137 (1981); for example,

-continued

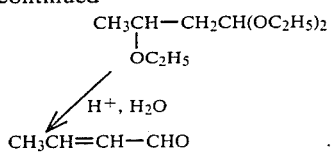

DETAILED DESCRIPTION OF THE INVENTION

This invention provides the following:

1(a). Process of preparing the polymer consisting essentially of the polymer of the formula $$R_H(Y^2\text{-}\!\!\!-\!\!\!\text{[}CH(OSi[R^1]_3)CH_2\text{]}_n CHO)_x \quad (1)$$

the process comprising contacting an ethenyloxysilane monomer, or mixture of such monomers, of the formula $CH_2\!\!=\!\!CHOSi(R^1)_3$, under polymerizing conditions, with (i) an initiator which is an aldehyde of the formula $$R_H(Y^2 CHO)_x \quad (1a);$$

or a precursor compound thereof of the formula $$R_H(Y^1 X^1)_x \quad (1b)$$

and (ii) a catalyst which is a suitable Lewis acid or a source of bifluoride ion, wherein, in the formulas:

$R_H$ is H or a hydrocarbyl radical of valence x which may be alkyl, cycloalkyl, aryl, alkaryl or aralkyl, containing up to 20 carbon atoms, or a polymeric radical containing at least 20 carbon atoms, and which, optionally, may contain ether oxygen and/or one or more functional substituents which are unreactive under polymerizing conditions;

x is an integer and is at least 1, preferably 1 to 10, most preferably 1;

n is an integer and is at least 5;

$Y^2$ is $Y^3(C[R^4]_2)_y$;

$Y^3$ is a connecting bond or a divalent radical selected from

—C(O)—, —R$^2$—, —N(R$^3$)CH$_2$—,

—CH(L$^1$)—, —CH(L$^2$)CH$_2$—, —CH(L$^3$)—(CH$_2$)$_a$—C(O)— and

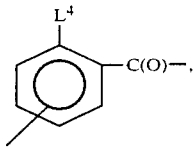

wherein
$R^2$ is $C_{1\text{-}10}$ alkylene or $C_{7\text{-}20}$ aralkylene, $R^3$ is $C_{1\text{-}4}$ alkyl, $L^1$ is —OR$^5$, —OR$^6$OSi[R$^1$]$_3$ or —OSi[R$^1$]$_3$, wherein R$^5$ is $C_{1\text{-}4}$ alkyl and R$^6$ is $C_{1\text{-}4}$ alkylene, L$^2$ is —OSi[R$^1$]$_3$, L$^3$ is —(CH$_2$)$_b$—C(O)OSi[R$^1$]$_3$, L$^4$ is —C(O)OSi[R$^1$]$_3$, and each of a and b, independently, is 0, 1 or 2;

y is 0 or 1;

each R$^1$ is independently selected from $C_{1\text{-}10}$ alkyl, alkenyl having 2 or 4–10 carbon atoms, and $C_{6\text{-}10}$ aryl, alkaryl and aralkyl;

each R$^4$ is independently selected from H, $C_{1\text{-}10}$ alkyl and $C_{6\text{-}10}$ aryl, aralkyl or alkaryl;

X$^1$ is —OH, —Cl, —Br, —H, —R$^5$, —OR$^5$, Cl$^\ominus$, Br$^\ominus$, I$^\ominus$, O$^\ominus$R$^5$, O$^\ominus$COR$^5$, or CH$_3$C$_6$H$_4$SO$_3$$^\ominus$, wherein R$^5$ is $C_{1\text{-}4}$ alkyl; preferably, X$^1$ is —OH, —Cl, —Br, or —OR$^5$;

Y$^1$ is a connecting bond or a divalent radical selected from
—C(O)—, —R$^2$—, CH[OSi(R$^1$)$_3$]—, —CH(OR$^5$)— and —N$^\oplus$(R$^3$)=CH$_2$, wherein
R$^1$, R$^2$, R$^3$ and R$^5$ are as defined above; preferably, Y$^1$ is a connecting bond,
—C(O)—, —CH(OR$^5$)— or —R$^2$—; and
Y$^1$ and X$^1$ taken together is

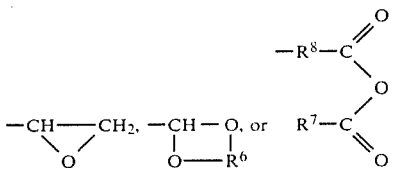

wherein
R$^6$ is $C_{1\text{-}4}$ alkylene, R$^8$ is a connecting bond or $C_{1\text{-}10}$ alkylene, and R$^7$ is $C_{1\text{-}10}$ alkyl or $C_{6\text{-}10}$ aryl, or
R$^8$ and R$^7$ taken together is

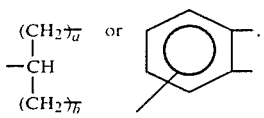

wherein a and b are as defined above;
with the provisos that:
(i) when Y$^1$ is a connecting bond, X$^1$ is —OH;
(ii) when Y$^1$ is —C(O)—, X$^1$ is —Cl, —Br, —H, or —R$^5$;
(iii) when Y$^1$ is —R$^2$—, X$^1$ is —Cl or —Br; and
(iv) when Y$^1$ is —N$^\oplus$(R$^3$)=CH$_2$, X$^1$ is O$^\ominus$R$^5$, O$^\ominus$COR$^5$, Cl$^\ominus$, Br$^\ominus$, I$^\ominus$, or CH$_3$C$_6$H$_4$SO$_3$$^\ominus$.

Preferably, each R$^1$ is alkyl and the total number of carbon atoms in all of the R$^1$ groups is at least six; more preferably, at least one R$^1$ alkyl is branched; most preferably, one R$^1$ alkyl is t-butyl and two R$^1$ alkyl groups are CH$_3$. Preferably, at least one R$^4$ is H or alkyl, preferably methyl; most preferably, each R$^4$ is H. Also, preferably, Y$^3$ is a connecting bond. —C(O)—, —R$^2$— or —CH(L$^1$)—.

1(b). Process of 1(a) wherein the aldehyde initiator of formula 1a wherein y is 1 is produced in-situ by contacting an ethenyloxysilane of the formula $C[R^4]_2\!\!=\!\!CHOSi[R^1]_3$, under polymerizing conditions, with the aldehyde precursor compound of formula 1b wherein R$^1$ and R$^4$ are defined as above;

2. Process of preparing the polymer consisting essentially of the polymer of the formula

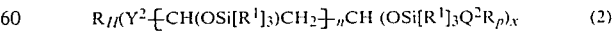

by reacting the polymer of formula 1, in the presence of a suitable Lewis acid or a source of bifluoride, fluoride, difluorotrimethylsilicate, cyano, or azido ions, with the compound of the formula (R$^1$)$_3$SiQ$^1$R$_p$, wherein, in the formulas:

R$_H$, Y$^2$, n, x and R$^1$ are defined as above;

Q$^1$ is a divalent radical selected from

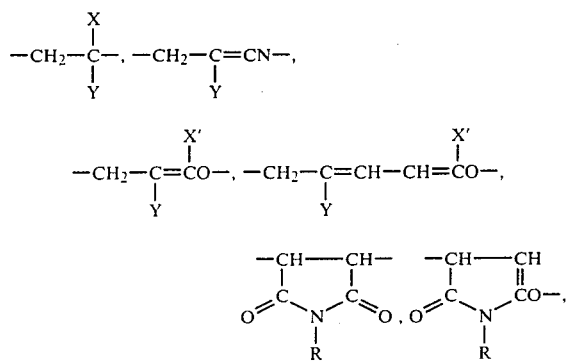

and mixtures thereof;

$Q^2$ is a keto or cyano group-containing divalent radical selected from

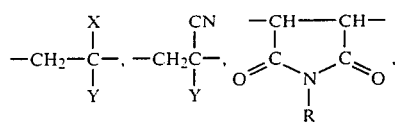

and mixtures thereof;

$R_p$ is H, $C_{1-4}$ alkyl, or a polymeric radical of a methacrylic and/or acrylic living polymer prepared by the process disclosed in U.S. Pat. No. 4,417,034 and in EPO Publication No. 0 068 887; preferably, $R_p$ is a polymeric radical, more preferably, such a radical prepared from methyl methacrylate;

X is —CN, —CH=CHC(O)X' or —C(O)X';

Y is —H, —CH$_3$, —CN or —CO$_2$R, provided however, when X is CH=CHC(O)X', Y is —H or —CH$_3$;

X' is —OSi(R$^1$)$_3$, —R, —OR or —NR'R'';

R is $C_{1-20}$ alkyl, alkenyl or alkadienyl; $C_{6-20}$ cycloalkyl, aryl, alkaryl or aralkyl; any of said groups optionally containing one or more ether oxygen atoms within aliphatic segments thereof; and any of all the aforesaid groups optionally containing one or more functional substituents that are unreactive under its preparative polymerizing conditions; and each of R' and R'' is independently selected from $C_{1-4}$ alkyl.

3. Process of preparing the polymer of the formula $$R_H(Y^2\text{\textemdash}[CH(OSi[R^1]_3)CH_2]_n X^3)_x \qquad (3)$$

by reacting the polymer of formula 1 with an aldehyde-active reagent other than the compound of the formula $(R^1)_3SiQ^1R_p$, as defined above, preferably a conventional aldehyde-active reagent selected from an oxidizing agent, a reducing agent and an aldehyde-active compound of the formula $R_p{}^1X^2$ wherein:

$R_H$, $R^1$, $Y^2$, n and x are defined as above;

$R_p{}^1$ is defined as for $R_H$;

$X^2$ is a monovalent radical selected from —OH, —CN, —SO$_3$M, —NH$_2$, —ONH$_2$, —NHNH$_2$, —NHC(O)NH$_2$, —NHC(NH)NH$_2$, —NHNHC(O)NH$_2$, and —G wherein G is the halometal portion of a Grignard reagent and M is H, an alkali metal or ammonium; and $X^3$ is —CH$_2$OH, —CO$_2$M or —Q$^3R_p{}^1$ wherein $R_p{}^1$ is defined as for $R_H$ and $Q^3$ is a di- or trivalent radical selected from

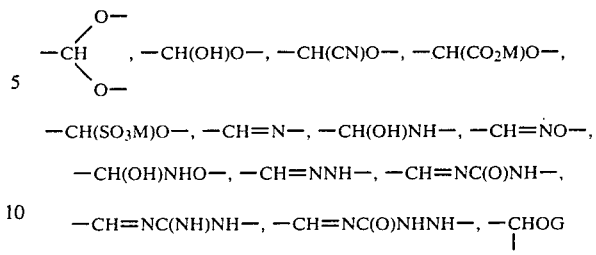

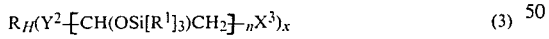

wherein M is H, an alkali metal or ammonium and G is the halometal portion of a Grignard reagent.

4. Process of polymerizing an ethenyloxysilane monomer, or mixture of such monomers, of the formula CH$_2$=CHOSi(R$^1$)$_3$, wherein each R$^1$ is independently selected from $C_{1-10}$ alkyl, alkenyl having 2 or 4–10 carbon atoms, and $C_{6-10}$ aryl, alkaryl and aralkyl, by contacting the monomer or mixture of monomers under polymerizing conditions with (i) an aldehyde initiator and (ii) a catalyst which is a suitable Lewis acid or a source of bifluoride ion.

5. The polymer consisting essentially of the polymer of formula 1.

6. The polymer consisting essentially of the polymer of formula 2.

7. The polymer consisting essentially of the polymer of formula 3.

8. The polymer prepared by hydrolyzing the polymer of formula 1.

9. The polymer prepared by hydrolyzing the polymer of formula 2.

10. The polymer prepared by hydrolyzing the polymer of formula 3.

11. The polymer prepared by the process of 4.

Preferred embodiments of the processes of preparing the polymers of formulas 1, 2 and 3 include the additional steps wherein the silyl ether groups in the polymers are hydrolyzed to —OH, particularly in the presence of fluoride or bifluoride ions.

By "initiator" is meant the aldehyde 1a or aldehyde precursor compound 1b which, in the polymerization processes of the invention, initiates growth of polymer chains and, in conjunction with monomer, essentially controls $\overline{M}_n$ of the polymer product, such that $\overline{M}_n$ is approximately equal to $$\left[\left(\frac{N_m}{N_I}\cdot M_m\right) + M_I\right]$$

wherein $N_m$ and $N_I$, respectively, are the number of moles of monomer and initiator, and $M_m$ and $M_I$, respectively, are the molecular weights of monomer and initiator. Aldehyde initiators include, but are not limited to, those of formula 1a.

Aldehydes which are useful initiators in the invention for preparing the polymer of formula 1 or the polymer from the process of 4 include, but are not limited to, aliphatic, aromatic and polymeric aldehydes, for example, acetaldehyde, isobutyraldehyde, neopentaldehyde, 3-(dimethylamino)propionaldehyde, 3,3',3''-(1,3,5-benzenetriyl)tris(propionaldehyde), benzaldehyde, terephthaldehyde and acrolein homo- and copolymers.

By "aldehyde precursor compound" is meant the compound of formula 1b which, when contacted with an ethenyloxysilane of the formula $C[R^4]_2$=CHOSi$[R^1]_3$ under polymerizing conditions, forms an aldehyde of formula 1a. When the ethenyloxysilane is a monomer used in the invention for preparing the polymer of formula 1, i.e., each $R^4$ group is H, polymerization of said monomer is initiated in the aldehyde-forming reaction between monomer and the aldehyde precursor compound. If one or both $R^4$ groups is not H, the product is an aldehyde of formula 1a which is capable of initiating polymerization of ethenyloxysilane monomer. Aldehyde precursor compounds include, but are not limited to, those of the formula 1b, representative of which are: water; alkanols; aliphatic, aromatic and polymeric primary and secondary bromides and chlorides, for example, n-hexyl bromide and chloride, $\alpha,\alpha'$-dibromo- and dichloroxylenes, poly(p-chloromethylstyrene); aldehyde acetals, including cyclic acetals; acyl bromides and chlorides; oxiranes; aliphatic and aromatic ketones, for example, diethylketone, cyclohexanone and benzophenone; and aliphatic and aromatic imino esters and their salts. All are known compounds or are readily prepared by known methods.

Haloaromatic compounds, such as bromobenzene, should be avoided unless suitably activated by substituents which are themselves inert under polymerizing conditions.

The in-situ reaction between the aldehyde precursor compound and an ethenyloxysilane of the formula $C[R^4]_2$=CHOSi$[R^1]_3$ requires at least one mole of ethenyloxysilane per mole of precursor compound. When at least one $R^4$ in the silane is not H, i.e., the silane is not a monomer, the reaction is usually equimolar (1:1). Ethenyloxysilanes which are preferred for use in the in-situ preparation of the aldehyde initiator 1a from the aldehyde precursor compound 1b include 2-substituted silanes wherein one or both of $R^4$ is alkyl, preferably methyl; most preferably, each $R^1$ group is also alkyl.

Catalysts which are useful in the invention process for preparing the polymer of formula 1 or the polymer from the process of 4 are known or are readily prepared by known methods. These catalysts either are sources of bifluoride ions, such as potassium bifluoride, tetrabutylammonium bifluoride, or tris(dimethylamino)-sulfonium bifluoride, or are Lewis acids, such as zinc iodide, zinc bromide, zinc chloride, boron trifluoride etherate, or dialkyl aluminum halides. Bifluoride ion, zinc bromide, zinc chloride, and zinc iodide are preferred; zinc bromide is most preferred.

The process of preparing the polymer of formula 1 is carried out at about $-100°$ C. to about 120° C., preferably above about 0° C. to 70° C., most preferably 20° C. to 40° C. When boron trifluoride etherate or a dialkyl aluminum halide is used as the catalyst, the polymerization is carried out above about 0° C. By "polymerizing conditions" is meant an inert liquid medium in the temperature range specified above. A solvent is desirable but not essential.

Suitable solvents are aprotic liquids in which the monomer(s), initiator or initiator precursor and catalyst are sufficiently dispersible and/or soluble for reaction (polymerization) to occur. When anionic species are employed as catalysts, suitable solvents are polar liquids and include tetrahydrofuran (THF), N,N-dimethylacetamide, acetonitrile, N-methylpyrrolidone, ethyl acetate, bromobenzene, diethoxyethane and Cellosolve acetate; THF and acetonitrile are preferred. When the catalyst is a zinc compound or other Lewis acid, suitable solvents are limited to aromatic hydrocarbons, such as toluene or xylene, aliphatic hydrocarbons or chlorinated hydrocarbons; toluene, dichloromethane and 1,2-dichloroethane are preferred. Chlorinated solvents should be avoided when anionic catalysts are employed.

The ethenyloxysilane monomers which are preferred for use in the invention process are those wherein each $R^1$ group is alkyl and the total number of carbon atoms in all of the $R^1$ groups is at least six; more preferably, at least one of these alkyl groups is branched. It has been discovered that use of such monomers can provide polymers of formula 1 having significantly higher molecular weights than those which can be prepared from nonpreferred ethenyloxysilane monomers. While lower molecular weight polymers of formula 1 are useful, especially in blends with other polymers, the ability to attain higher molecular weight when desired is a preferred feature.

The ethenyloxysilane monomers which are useful in the invention process for preparing the polymers of formula 1 are liquids and can be polymerized without a solvent, although a solvent is beneficial in controlling temperature during the polymerization which is exothermic. When a solvent is used, the monomer can be dispersed in the solvent at concentrations of at least 1 wt %; preferably, at least 10 wt %; more preferably, about 50 wt %. The initiator is employed at a concentration such that the monomer/initator molar ratio is greater than 1; preferably, greater than 5. The amount of initiator can be varied to control the molecular weight of the product, in accordance with known polymerization procedures. The catalyst is normally present in such an amount that the molar ratio of initiator to catalyst is in the range 0.1:1 to 200:1, preferably, 0.1:1 to 1:1.

In the invention polymerization process wherein the polymer of formula 1 is prepared, it is preferable to charge the initator, catalyst, and solvent, if a solvent is used, to the polymerization vessel before adding the monomer(s), especially if polymers of narrow molecular weight distribution, that is, $\overline{M}_w/\overline{M}_n$ is about 1, are desired (monodisperse polymers). At higher values of $\overline{M}_w/\overline{M}_n$ the polymer is said by the art to be polydisperse.

Although it is preferable to charge the initiator, catalyst and solvent to the polymerization vessel before adding monomer(s), subsequent polymerization rate being controlled by monomer addition, further additions of catalyst may sometimes be necessary to sustain polymerization.

The invention polymer of formula 1 contains terminal —CH$_2$CHO aldehydic groups and remains "living" unless contacted by a reagent which is active towards aldehydes, including compounds of the aforesaid formula $(R^1)_3SiQ^1R_p$. By "living" is meant that the polymer is capable of polymerizing further in the presence of monomer(s) and catalyst, permitting the preparation of "tailored" copolymers, such as block copolymers having highly desirable properties.

Although not intending to be bound by this explanation, in the process for preparing the polymer of formula 1, the ethenyloxysilane monomer is believed to be cleaved at the O—Si bond by the initiator of formula 1a or 1b, the cleavage being catalyzed by bifluoride ion or selected Lewis acids. Polymerization proceeds by addition of further monomer units to the C=O bond of the aldehyde intermediate, yielding the polymer of formula 1.

The noncarbaldehyde portion of the initiating aldehyde of formula 1a, i.e., $R_H(Y^2)_x$, is found, by analysis, to be attached to the nonliving (noncarbaldehyde) end of the polymer. When the initiator is an aldehyde precursor compound of formula 1b, the aldehdye-forming, 1:1 reaction with monomer results in a Si-containing adduct or by-product. Si-containing by-products are formed in Examples 9, 10 and 12 to 14 wherein alcohol, water and aralkyl halides are employed as initiators, as shown in the following table:

TABLE

| Ex. | Initiator $R_H(Y^1X^1)_x$ | 1:1 Adduct $R_H(Y^2CHO)_x$ | By-Product |
|---|---|---|---|
| 9 | $C_2H_5OH$ | $CH_3CHO$ | $(R^1)_3Si-OC_2H_5$ |
| 10 | $H_2O$ | $CH_3CHO$ | $[(R^1)_3Si]_2O$ |
| 12 | $(C_6H_5)_2CHCl$ | $(C_6H_5)_2CHCH_2CHO$ | $(R^1)_3SiCl$ |
| 13 | $C_6H_4(CH_2Br)_2$ | $C_6H_4(CH_2CH_2CHO)_2$ | $(R^1)_3SiBr$ |
| 14 | $C_6H_3(CH_2Br)_3$ | $C_6H_3(CH_2CH_2CHO)_3$ | $(R^1)_3SiBr$ |
| — | $CH_3C(O)Cl$ | $CH_3C(O)CH_2CHO$ | $(R^1)_3SiCl$ |
| — | $CH_3N(CH_3)^{\oplus}=CH_2$ $^{\ominus}OC(O)CH_3$ | $CH_3N(CH_3)CH_2CH_2CHO$ | $(R^1)_3SiOC(O)CH_3$ |
| — | $CH_2CH_2$ (epoxide) | $(R^1)_3SiOCH_2CH_2CH_2CHO$ | None |
| — | succinic anhydride | $(R^1)_3SiOC(O)CH_2CH_2C(O)CH_2CHO$ | None |
| — | $CH_3CH(OCH_2)_2$ dioxolane | $(R^1)_3SiOCH_2CH_2OCH(CH_3)CH_2CHO$ | None |

In Example 14, the moiety $R_H$ is trivalent, i.e., x is 3, and in this case, the polymer formed is a 3-arm star. Other illustrations wherein x is greater than one are provided in subsequent examples.

Terminal functions, such as $-C(O)OSi(R^1)_3$, $-OSi(R^1)_3$ and substituted amino, can be introduced at the non-living end of the polymer chain by using oxiranes, anhydrides, cyclic acetals or amine salts as initiators. These and other functions which are unreactive under polymerizing conditions may also be introduced into the polymer via the initiator moiety $R_H$, as described above.

The process of preparing the polymer of formula 2 is carried out by reacting the polymer of formula 1 and the compound of the formula $(R^1)_3SiQ^1R_p$, as defined above, in the presence of a catalyst, also defined above, at about $-20°$ C. to about 150° C., preferably 0° C. to 50° C. A solvent is usually desirable, especially when $R_p$ is a polymeric radical as defined above. A solvent may not be required if the compound $(R^1)_3SiQ^1R_p$ is liquid or gaseous. Suitable solvents include those described above for the preparation of the polymer of formula 1, with the same restrictions regarding the use of chlorinated hydrocarbons.

Catalysts which are useful in the invention process for preparing the polymer of formula 2 include those recited above for preparing the polymer of formula 1. In addition, sources of fluoride, cyano or azido ions can be employed. Other useful catalysts include those which are disclosed as co-catalysts in the aforesaid U.S. Pat. No. 4,417,034 and EPO Publication No. 0 068 887. When cyano or azido ion sources are employed as catalysts, it is preferable to place the solvent, catalyst, and silyl compound of the formula $(R^1)_3SiQ^1R_p$ in the reactor prior to adding the polymer of formula 1.

Preferred reagents $(R^1)_3SiQ^1R_p$ include the living polymer disclosed in the aforesaid U.S. Pat. No. 4,417,034 and EPO Publication No. 0 068 887, wherein $R_p$ is a polymeric radical. When such living polymers are employed, the polymer of formula 2 comprises ethenyloxy-acrylic block copolymers which may be linear or branched, the latter having, for example, star or comb configurations. As an illustration, a typical living poly(methyl methacrylate) of the formula

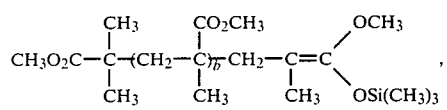

wherein b is the number of monomer repeat units in the polymer which, for simplicity, may be represented as

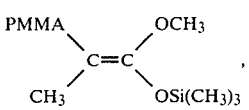

wherein PMMA represents the poly(methyl methacrylate) chain, can be reacted with the polymer of formula 1 to yield a block polymer of formula 2, for example, in accordance with the following equation wherein n is an integer and is at least 5:

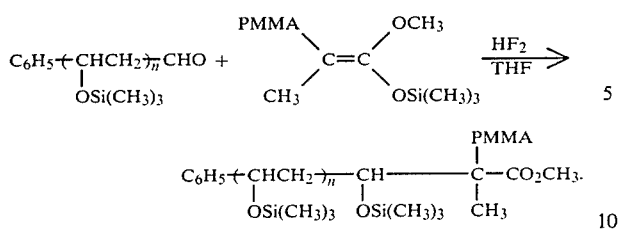

Using such a process, multi-block, linear or branched copolymers can be produced, depending on the structure of $R_p$ and $Q^1$. Moreover, as discussed above, the reactant polymer of formula 1 may itself be a block, star-branched, comb and/or branched copolymer, depending on the structure of $R_H$ and the value of x. Thus, the polymer of formula 2 embraces a wide spectrum of copolymer structural configurations.

In the process of preparing the polymer of formula 3, the polymer of formula 1 is reacted with an aldehyde-active reagent other than the compound of the formula $(R^1)_3SiQ^1R_p$ of the process of 2, preferably a conventional aldehyde-active reagent selected from an oxidizing agent, a reducing agent or an aldehyde-active compound of the formula $R_p{}^1X^2$, at a temperature of about $-20°$ C. to about $150°$ C., preferably $0°$ C. to $80°$ C. Suitable oxidants include solutions of acidified potassium dichromate, ammoniacal silver nitrate, Fehling's solution ($CaSO_4$ in an alkaline solution of a tartarate salt). Suitable reductants include catalytic hydrogenation catalysts, such as Raney nickel or platinum, zinc and sodium hydroxide, iron and acetic acid, and aluminum trialkoxides, such as aluminum tri(isopropoxide). Suitable $R_p{}^1X^2$ compounds include alcohols, hydrogen cyanide, amines, urea and substituted ureas, morpholine, hydrazine, hydroxylamine, ammonia and Grignard reagents, such as alkyl magnesium bromide or iodide. Such reactions are usually carried out in a solvent, particularly when the oxidizing or reducing agent or aldehyde-active compound is a solid. Suitable solvents include those described above for the preparation of the polymer of formula 1, without the restriction regarding chlorinated hydrocarbons. THF and chlorinated hydrocarbons are preferred solvents. The resulting polymers can have useful functionality. For example, polymers containing the terminal groups $-CO_2M$ or $-CH_2OH$ result from oxidation or reduction, respectively, of the $-CHO$ group in the polymer of formula 1. Reaction of the polymer with alkali metal bisulfite, hydrogen cyanide or an alkanol ROH provides polymers having $-CH(OH)X'$ functions wherein $X'$ is, respectively, $-SO_3M$, $-CN$ and $-OR$; acid hydrolysis of the cyanohydrin provides $-CH(OH)CO_2H$; and further reaction of the hemiacetal with alkanol provides $-CH(OR)_2$. Reaction of the polymer of formula 1 with ammonia, primary amines, hydroxylamine, hydrazine, urea, morpholine, semicarbazide, alkylhydrazines, or arylhydrazines provides terminal functions $-CH=NX''$ where $X''$ is, respectively, $-H$, $-R$, $-OH$, $-NH_2$, $-C(O)NH_2$, $-C(NH)NH_2$, $-NHCONH_2$ and $-NHR$ (for the alkyl- and arylhydrazines), wherein R is as defined above.

Pendant groups $-OSi(R^1)_3$, which may be present in polymers of the invention, can be converted to $-OH$ groups by known methods, such as by hydrolysis, for example, by treatment with a source of fluoride ion, such as tetraalkylammonium fluoride, dissolved in a THF-methanol mixture. The pendant $-OH$ functions are useful reactive sites for cross-linking or other chemical modification.

In the following examples of specific embodiments of the invention, parts and percentages are by weight and temperatures are in degrees Celsius unless otherwise specified. The polydispersity (D) of the polymer products of the examples is defined by $D=\overline{M}_w/\overline{M}_n$, the molecular weights being determined by gel permeation chromatography (GPC). Unless otherwise specified, molecular weights were measured on the polymer of formula 1 before silyl groups were removed, that is, on the polymers wherein $X^1$ in the formula is $-Si(R^1)_3$. In the Examples:

EBDS is (ethenyloxy)-t-butyldimethylsilane,
TBAF is tetrabutylammonium fluoride,
ETS is (ethenyloxy)trimethylsilane,
TASHF$_2$ is tri(dimethylamino)sulfonium bifluoride,
MPTS is [(1-methoxy-2-methyl-1-propenyl)oxy]-trimethylsilane

EXAMPLE 1

Polymerization of (ethenyloxy)-t-butyldimethylsilane (EBDS) initiated by benzaldehyde in the presence of zinc chloride A 3-necked 50 mL flask, fitted with a stirrer, argon inlet and a thermocouple, was charged with zinc chloride (anhydrous, 0.035 g, 0.26 mmol), dichloromethane (20 mL) and benzaldehyde (0.25 mL, 2.46 mmol). Then, (ethenyloxy)-t-butyldimethylsilane (EBDS) (7.41 g, 46.81 mmol) was added via a syringe pump at 0.5 mL/min. The ensuing reaction was accompanied by a temperature rise to $35.4°$ from $26.0°$. The mixture was stirred for 3 h (or until the temperature had dropped to $26°$) and evaporated. The residue (7.70 g) was dissolved in dichloromethane (10 mL) and added to methanol (1 L) to precipitate the polymer. The white precipitate was collected by filtration and dried at $60°/0.1$ mm Hg to give 7.50 g of white powdery material. Molecular weight was determined by gel permeation chromatography (GPC) (PMMA Lucite® standard) to be: $\overline{M}_n$ 2180, $\overline{M}_w$ 2800, D 1.28, intrinsic viscosity, [η], 0.021 dlg$^{-1}$ (THF, $25°$), $\overline{M}_n$ (VPO) 4300 (THF, $37°$), $\overline{M}_n$ (calc.) 3112. $^1$H NMR (CDCL$_3$, ppm): δ9.82 ($-CHO$, triplet, 1H), 7.20 ($-C_6H_5$, singlet 5H), 5.45 (Ar$-CH$, triplet, 1H), 3.87 ($-HCOSi$, broad, 16H), 1.58 ($-CH_2-$, broad, 34H), 0.88 ($-SiC(CH_3)_3$, singlet, 144H), 0.08 ($-Si(CH_3)_2$, singlet, 96H). $^{13}$C NMR (CDCl$_3$, ppm): $\delta -3.7$ ($-Si(CH_3)_2$), 18.1 (quaternary carbon of t-butyl group), 26.2 (t-butyl methyl carbon), 46.8 (chain methine carbon), 72.4 (terminal methine carbon), 126.3 (orthoaromatic carbon), 127.0 (para-aromatic carbon), 128.1 (meta-aromatic carbon), 202.1 (terminal aldehyde carbon).

EXAMPLE 2

A. Polymerization of EBDS initiated by benzaldehyde in the presence of zinc bromide The apparatus and procedure employed were as in EXAMPLE 1, except that anhydrous zinc bromide (0.056 g, 0.25 mmol) was substituted for zinc chloride, 7.60 g of polymer was isolated as a white powder. $\overline{M}_n$ 2280, $\overline{M}_w$ 3060, D 1.35 (GPC), [η] 0.029 dlg$^{-1}$ (THF, $25°$), $\overline{M}_n$ (VPO) 2700 (THF, $37°$), $\overline{M}_n$ (calc.) 3112.

B. Polymerization at ZnBr₂/initiator mole ratio of 1:1

A 3-necked 250 mL reactor, fitted with a stirrer, argon inlet and a thermocouple, was charged with anhydrous zinc bromide (0.023 g, 0.10 mmol), dichloromethane (15 mL) and benzaldehyde (0.01 mL, 0.098 mmol) at 25°. Then, the monomer, EBDS (15.8 g), was added dropwise over a period of 30 minutes. The temperature of the reaction rose to 40° accompanied by noticeable increase in the viscosity of the solution. The mixture was stirred until the exothermic reaction subsided completely. It was then poured into methanol (2 L) and the resulting precipitate was collected by suction filtration and dried at 60°/0.1 mm Hg; yield 15.5 g; [η] 0.076 dlg⁻¹ (THF, 25°) (indicates unusually high molecular weight), $\overline{M}_n$ 79800, $\overline{M}_w$ 121000, D 1.51.

C. Polymerization at ZnBr₂/initiator mole ratio of 2:1

Using a reactor similar to that of Example 4 which follows, EBDS (29.64 g, 187 mmol) was polymerized in the presence of benzaldehyde (0.04 g, 0.39 mmol) and zinc bromide (0.18 g, 0.80 mmol) in dichloromethane (40 mL). Upon precipitation from methanol (4 L), 29.70 g of polymer was isolated as a white powdery material. $\overline{M}_n$ 13500, $\overline{M}_w$ 24900, D 1.85.

EXAMPLE 3

Polymerization of EBDS initiated by benzaldehyde in the presence of titanium tetrachloride.

To the reactor used for Example 1 were added dichloromethane (20 mL), titanium tetrachloride (0.50 mL, 0.5 M in CH₂Cl₂), and benzaldehyde (0.25 mL, 2.46 mmol). Then, EBDS (7.41 g, 46.81 mmol) was added over a period of 10 minutes. The mixture was stirred for 3 h, evaporated and the viscous oily residue was dried; yield 0.70 g; $\overline{M}_n$ 476, $\overline{M}_w$ 801, D 1.68, $\overline{M}_n$ (VPO) 410 (THF, 37°), $\overline{M}_n$ (calc. from ¹H NMR) 586, $\overline{M}_n$ (calc.) 3112.

EXAMPLE 4

Conversion of poly [(ethenyloxy)-t-butyldimethylsilane](poly[EBDS]) into poly(vinyl alcohol)

This example illustrates cleavage of trialkylsilyl groups.

A 3-necked 100 mL reactor, fitted with a stirrer, reflux condenser, and an argon inlet was charged with tetrahydrofuran (20 mL), methanol (5 mL) and poly [EBDS] (10 g made by the process of Example 1). To the resultant solution was added tetrabutylammonium fluoride (TBAF, 20 mL, 1M in THF) containing water (5%) and the resulting mixture was heated to 70°. It was allowed to reflux for 90 minutes and was then cooled to room temperature. The solvent was evaporated in vacuo and the residue was dissolved in boiling water (100 mL). Upon addition of the water solution to methanol (2 L) a precipitate formed; it was collected by filtration and dried; yield, 2.7 g; ¹³C NMR (DMSO-d₆, ppm): 44–46 (multiplet, chain methine carbon), 65–67 (chain methylene carbon), 126–128 (aromatic carbon). Detailed analysis of the ¹³C NMR spectrum showed that the polyvinyl alcohol was 57% syndiotactic, 43% heterotactic (diads).

EXAMPLE 5

Polymerization of (ethenyloxy)trimethylsilane (ETS) initiated by benzaldehyde and conversion to a polyvinyl alcohol)

A. To a solution of (ethenyloxy)trimethylsilane (ETS) (20.77 g, 0.18 mol) in THF (12 mL) in a reactor similar to that of Example 6 which follows was added benzaldehyde (1.0 mL, 9.85 mmol). Then, the catalyst, tris(dimethylamino)sulfonium bifluoride (TASHF₂, 0.12 mL, 1M in acetonitrile), was added. The mixture was stirred for 16 h and then treated with tetrabutylammonium fluoride (2.0 mL, 1M in 95% THF/5% water) to hydrolyze pendant —OSi(CH₃)₃ groups. After the ensuing exothermic reaction had subsided the mixture was poured into methanol (1 L). The slightly yellowish precipitate was collected by filtration, dried and weighed; yield, 6.22 g; Dp was calculated from proton NMR to be 15, Dp (theory) 18, ¹H NMR (D₂O), δ ppm: 1.25 (CH₂, 30H), 310 (OH, 15H), 4.0 (—CH—O, 15H), 7.1–7.6 (ArH, 5H), 9.50 (HC=O, 1H).

B. A polymerization similar to that of Part A was performed except that the TASHF₂ catalyst was replaced with a similar catalyst in which the bifluoride ions were deuterium-exchanged. Polymer having a Dp (NMR) of 20 was obtained, Dp (theory) 15. The proton NMR spectrum was identical to that obtained in Part A.

EXAMPLE 6

Polymerization of ETS at low temperature

A solution of TASHF₂ (0.10 g, 0.50 mmol) in THF (5 mL) in a reactor identical to that used in Example 4 was cooled to −71.8°. Then, ETS (0.79 g, 6.80 mmol) was added, followed by addition of benzaldehyde (0.51 mL, 5.0 mmol). The temperature of the reaction mixture rose from −71.8° to −62.2°. After the exotherm had subsided completely, more monomer (ETS, 5.02 g, 43.3 mmol) was added. The mixture was stirred for 1 h at −71° and then allowed to warm to 25°. The reactor was then heated to 70° and the contents was allowed to reflux for 1 h. The mixture was allowed to cool to 25°, then evaporated, and the residue was dried; yield, 1.98 g of a mixture of poly(vinyl alcohol) (PVA) and silylated PVA. Dp (NMR) 8, Dp (theory) 10.

EXAMPLE 7

Polymerization of EBDS initiated by benzaldehyde in the presence of TASHF₂

A 100 mL reactor similar to that used in Example 1 was charged with THF (30 mL), benzaldehyde (0.26 g, 2.45 mmol) and TASHF₂ (0.1 mL, 1M in acetonitrile). The reactor was cooled to −65.2° while the contents were continuously stirred under argon. Then EBDS (7.41 g, 46.81 mmol) was added at approximately 1.0 mL/minutes via a syringe pump. The mixture was stirred at −60° for 3 h, allowed to warm to 25° and then evaporated. The residue was dried at 60°/0.1 mm Hg for 12 h; yield, 7.60 g.

EXAMPLE 8

Polymerization of EBDS initiated by benzaldehyde in the presence of TASHF₂ in THF at higher temperature A. The procedure of Example 7 was used, except that reaction was started at ambient temperature. EBDS was polymerized to give 7.70 g of polymer. The exothermic reaction caused the temperature to rise to 43.2° (with boiling) during the course of monomer addition.

B. The example of part A was repeated, except that toluene was substituted for THF as the solvent; 7.50 g of polymer was obtained.

EXAMPLE 9

Polymerization of EBDS in the presence of ethanol as the aldehyde initiator precursor, and zinc bromide This example illustrates aldehyde initiator-generation by a proton source and also demonstrates that the polymer is living.

A reactor similar to that used in Example 1 was charged with zinc bromide (0.023 g, 0.10 mmol) and ethyl alcohol (0.03 mL, 0.51 mmol). Then, dichloromethane (10 mL) was added, followed by addition of the monomer, EBDS (3.93 g, 24.8 mmol). The temperature rose from 25.4° to 42.2° with boiling. After the exotherm had subsided completely, the mixture was stirred at 25° for 1 h. Then, a second portion of EBDS (1.96 g, 12.4 mmol) was added, whereupon the temperature rose to 38.8°. A third portion of monomer (1.96 g) was added and the temperature rose to 36.5° from 26° C. The mixture became noticeably viscous and stirring was continued until the exotherm subsided completely. Then, it was poured slowly into methanol (1 L) to precipitate the polymer which was filtered; the white powdery precipitate which was recovered was dried well; yield. 7.0 g, $\overline{M}_n$ 6340, $\overline{M}_w$ 15000, D 2.37, $\overline{M}_n$ (calc.) 15450.

EXAMPLE 10

Polymerization of EBDS in the presence of water as the aldehyde initiator precursor, and zinc bromide The procedure of Example 9 was substantially repeated using the following reagents: EBDS (7.85 g, 49.6 mmol), zinc bromide (0.023 g, 0.10 mmol), dichloromethane (10 mL) and, instead of ethyl alcohol, distilled water (0.02 g, 1.10 mmol). Addition of the first batch of EBDS (3.93 g) was accompanied by a temperature rise to 41.6°. The second addition of monomer (1.96 g) caused the temperature to rise to 35°, while on adding a third portion (1.96 g) it rose to 37.4°. Each time the exotherm was allowed to subside completely before further monomer addition. Polymer was isolated by pouring the mixture into methanol (1 L), filtering the precipitate and drying it; yield, 7.20 g, $\overline{M}_n$ 3420, $\overline{M}_w$ 5620, D 1.64, $\overline{M}_n$ (calc.) 3569.

EXAMPLE 11

Polymerization of EBDS initiated by terephthaldehyde in the presence of zinc bromide This example illustrates polymerization in two directions using a dialdehyde initiator, and subsequent conversion of the aldehyde end groups into ester end groups.

A reactor similar to that used in Example 1 was charged with dichloromethane (20 mL), zinc bromide (0.56 g, 2.50 mmol), and terephthaldehyde (0.27 g, 2 mmol). With stirring under argon the monomer, EBDS (7.41 g, 46.81 mmol) was added dropwise over a 10 minute period. The temperature of the reaction rose to 40.6° from 26.0°. The mixture was stirred until the exothermic reaction subsided completely. Then, [(1-methoxy-2-methyl-1-propenyl)oxy]trimethylsilane (MPTS, 1.0 mL, 5.0 mmol) was added, whereupon, the temperature rose to 39.2° from 26.2°. The mixture was stirred until the temperature dropped to 26.0°. It was then evaporated and the residue was dried; yield, 8.60 g (white foam). This was dissolved in dichloromethane (20 mL) and poured into methanol (1 L). The precipitate was filtered off and dried; yield, 8.25 g, $\overline{M}_n$ 4150, $\overline{M}_w$ 5130, D 1.24, $\overline{M}_n$ (VPO), 4000 (THF, 37°), $\overline{M}_n$ (theory) 3840.

EXAMPLE 12

Polymerization of EBDS employing diphenylmethyl chloride as the aldehyde initiator precursor in the presence of zinc bromide A reactor similar to that used in Example 1 was charged with zinc bromide (0.06 g, 0.27 mmol), dichloromethane (10 mL) and diphenylmethyl chloride (0.20 g, 1.0 mmol). Then EBDS (7.86 g, 49.6 mmol) was added dropwise over 10 minutes. The mixture was stirred at ambient temperature for 18 h and then poured into methanol (1 L). The precipitate was collected by suction filtration and dried; yield, 7.1 g, $\overline{M}_n$ 6500, $\overline{M}_w$ 8000, D 1.23; $\overline{M}_n$ (theory) 7877.

EXAMPLE 13

Polymerization of EBDS employing 1,4-bis-(bromomethyl)-benzene as the aldehyde initiator precursor This example demonstrates growing of polymer chains in two directions using a difunctional alkyl halide as the aldehyde initiator precursor and preparation of a living polymer.

A reactor similar to that used in Example 1 was charged with zinc bromide (0.06 g, 0.27 mmol), dichloromethane (10 mL) and 1,4-bis(bromomethyl)benzene (0.13 g, 0.50 mmol). To the stirred mixture was added EBDS (3.93 g, 24.8 mmol) dropwise over 10 minutes. The temperature rose to 37° from 24°. The mixture was stirred until the exotherm subsided completely. Then, more EBDS (3.93 g) was added. The temperature rose to 36.5° from 24°, accompanied by noticeable increase in the viscosity of the mixture. After the exotherm subsided completely, the mixture was poured into methanol (1 L). The resultant white precipitate was collected by filtration, dried, and weighed; yield, 6.67 g, $\overline{M}_n$ 16500, $\overline{M}_w$ 37900, D 2.29, $\overline{M}_n$ (theory) 15808.

EXAMPLE 14

Polymerization of EBDS employing 1,3,5-tris-(bromomethyl)benzene as the aldehyde initiator precursor This Example illustrates preparation of a 3-arm star silylated poly(vinyl alcohol).

The procedure of Example 12 was repeated using zinc bromide (0.045 g, 0.20 mmol), 1,3,5-tris(bromomethyl)benzene (0.08 g, 0.22 mmol), dichloromethane (10 mL), and EBDS (3.93 g, 24.8 mmol); yield, 3.73 g, $\overline{M}_n$ 13600, $\overline{M}_w$ 30900, D 2.26. $\overline{M}_n$ (theory) 17284, $[\eta]$ 0.13 dlg$^{-1}$ (THF, 25°), glass transition temperature (Tg) 64° (differential scanning calorimetry, DSC).

EXAMPLE 15

Polymerization of EBDS employing 1,2,4,5-tetrakis-(bromomethyl)benzene as the aldehyde initiator precursor This Example illustrates preparation of a 4-arm star polymer.

The procedure of Example 12 was repeated using zinc bromide (0.06 g, 0.27 mmol), dichloromethane (10 mL), 1,2,4,5-tetrakis(bromomethyl)benzene (0.067 g, 0.15 mmol), and EBDS (3.93 g, 24.8 mmol); yield, 3.85 g, $\overline{M}_n$ 15500, $\overline{M}_w$ 35300, D 2.27, $\overline{M}_n$ (theory) 25822, [η] 0.16 dlg$^{-1}$ (THF, 25°), Tg 72° (DSC).

EXAMPLE 16

Preparation of block copolymer of poly(methyl methacrylate) and EBDS

A. Polymerization of methyl methacrylate (MMA) initiated by MPTS in the presence of a bifluoride ion The procedure described in U.S. Pat. No. 4,417,034 and in EPO Publication No. 0 068 887 was followed using TASHF$_2$ (0.05 mL, 0.1M in acetonitrile), THF (100 mL), MPTS (10 mL, 50 mmol) and methyl methacrylate (50 g, 0.50 mol). MMA was added over a 45 minute period and the mixture was evaporated in a moisture-free atmosphere to give 59 g of polymer. $\overline{M}_n$ 1080, $\overline{M}_w$ 1390, D 1.28, $\overline{M}_n$ (theory) 1174.

B. EBDS was polymerized according to the procedure of Example 1 using zinc bromide (0.45 g, 2.0 mmol), benzaldehyde (1.0 mL, 9.85 mmol), dichloromethane (20 mL) and EBDS (14.82 g, 93.6 mmol). After the exothermic reaction had completely subsided, a 19 mL-aliquot was removed with a syringe and evaporated, and the residue was dried to give 7.1 g of polymer. Upon purification by precipitation from methanol 6.84 g of polymer was obtained. $\overline{M}_n$ 1080, $\overline{M}_w$ 1300, D 1.21, $\overline{M}_n$ (VPO) 1300, $\overline{M}_n$ (theory) 1610. To the balance of the reaction mixture was added the living poly(methyl methacrylate) (6 g) prepared in Part A, as a solution in 10 mL of dichloromethane. The resulting mixture was stirred for 1 h and evaporated and the residue was dried to give 13 g of polymer. The polymer was dissolved in dichloromethane (10 mL) and the solution was poured into methanol (1 L). The precipitate was filtered and dried; yield, 12.48 g, $\overline{M}_n$ 1610, $\overline{M}_w$ 1910, D 1.15, $\overline{M}_n$ (theory) 2160.

Examples 17 to 20 illustrate the use of ZnCl$_2$, ZnBr$_2$, ZnI$_2$ and BF$_3$, respectively, as catalysts in the benzaldehyde-initiated polymerization of ETS. In each case pendant silyl groups were removed by washing the polymeric product with water. Yields of the recovered poly(vinyl alcohols) were low because of their high solubility in water.

EXAMPLE 17

Polymerization of ETS initiated by benzaldehyde in the presence of zinc chloride A reactor similar to that of Example 1 was charged with zinc chloride (0.15 g) and the reactor was heated under vacuum to dry the zinc chloride well. After the reactor was allowed to cool, dichloromethane (10 mL) and benzaldehyde (0.1 mL, 0.98 mmol) were charged. Then, ETS (6 mL, 41.4 mmol) was added dropwise via a syringe pump. The mixture was stirred for 2 h and evaporated. The resultant residue was dissolved in ethyl acetate and washed successively with two 100 mL-portions of water and one 100 mL-portion of saturated sodium chloride. The ethyl acetate layer was dried over MgSO$_4$, filtered, evaporated and the resultant residue was dried; 0.22 g of polymer was recovered.

EXAMPLE 18

The procedure of Example 17 was followed using ETS (6 mL), zinc bromide (0.25 g), dichloromethane (10 mL), benzaldehyde (0.1 mL), and MPTS (0.2 mL); 0.20 g of polymer was recovered.

EXAMPLE 19

The procedure of Example 17 was followed using zinc iodide (3.19 g, 10 mmol), benzaldehyde (0.2 mL), EBDS (10 mL), dichloromethane (10 mL) and MPTS (0.5 mL); 1.04 g of polymer was recovered. [η] 0.033 dlg$^{-1}$ (THF, 25°).

EXAMPLE 20

Polymerization of ETS catalyzed by boron trifluoride etherate

The procedure of Example 17 was followed, except that the initial heating to dry catalyst was omitted. Reagents used were: benzaldehyde (0.1 mL), boron trifluoride etherate (0.15 g), ETS (6 mL), dichloromethane (10 mL), and MPTS (0.2 mL); 0.69 g of polymer was recovered.

EXAMPLE 21

Preparation and polymerization of (ethenyloxy)diphenylmethylsilane

All equipment was dried at 135° and allowed to cool under dry nitrogen. All operations were carried out under dry nitrogen.

A. Preparation of lithium ethenoxide

In a 1-L flask equipped with a glass paddle stirrer, a dropping funnel, a syringe septum, and a reflux condenser capped with a nitrogen bubbler, was placed 200 mL of anhydrous tetrahydrofuran. With stirring, 315 mL of 1.6N n-butyl lithium in hexane was added in 1¼ h. The reaction mixture was allowed to stir at room temperature for about 18 h.

B. Reaction of lithium ethenoxide with diphenylmethylchlorosilane

The dropping funnel from the n-butyl lithium addition was replaced with a clean dry funnel which was loaded with 114 mL (128.6 g, 0.552 mole) of chlorodiphenylmethylsilane. The reaction flask was cooled in an ice bath and, with stirring, the chlorosilane was added over about 40 minutes. Stirring was continued at ice bath temperature for 1 h and then at room temperature for about 2 h. The mixture was filtered, the solid residue was rinsed with 20 mL of anhydrous tetrahydrofuran, and the rinsings were added to the filtrate. Distillation of the filtrate through a small spinning band still, first at atmospheric pressure to remove the solvents, and then at reduced pressure, yielded 88.69 g (67% yield) of (ethenyloxy)diphenylmethylsilane distilling at 86.2°–88.6°/0.10 mm. The $^1$H NMR spectrum (Cl$_3$CD) exhibited resonances at δ=0.63 ppm (CH$_3$), 4.11, 4.51 and 6.41 ppm (vinyl hydrogens) and 7.2–7.7 ppm (C$_6$H$_5$) with the relative intensities expected for (ethenyloxy)diphenylmethysilane.

C. Polymerization of (ethenyloxy)diphenylmethylsilane

All equipment was dried at 135° and allowed to cool under dry nitrogen. All operations were carried out under dry nitrogen.

In a 50 mL flask was placed 0.69 g of zinc iodide and a magnetic stirrer. The flask was evacuated to about 0.1 mm and then heated strongly with a heat gun for 10 minutes to dry the zinc iodide. After the flask had cooled to room temperature, it was brought back to atmospheric pressure with dry nitrogen and then fitted with a dropping funnel, a syringe septum and a reflux condenser capped with a nitrogen bubbler. The flask was then charged with 15 mL of methylene chloride, which had been distilled from phosphorus pentoxide, and 0.22 mL of benzaldehyde, which had been distilled from calcium hydride.

The dropping funnel was charged with 11.3 mL of (ethenyloxy)phenylmethylsilane which was then added with stirring over a period of 19 minutes. The polymerization was exothermic from the start, the temperature rising to a high of 32.8° from 24° (as measured by a thermocouple inserted through the syringe septum). After the addition was completed, the mixture was allowed to stir for a period of 20 h at room temperature. The mixture was then filtered to remove undissolved salt, and the filtrate was distilled on the water pump to remove the solvent. The viscous polymeric residue was further dried for several hours at about 0.5 mm under mild heating (up to 50°); wt. 11.6 g (~100% yield). The $^1$H NMR spectrum (Cl$_3$CD) showed that no vinyl hydrogen resonances remained, but have been replaced with broad resonances at $\delta = 3$-$4.2$ ppm and $0.8$-$2.0$ ppm, that is, in the regions expected for saturated CH (with an adjacent siloxy group) and CH$_2$ groups, respectively. The resonances expected for CH$_3$-Si and C$_6$H$_5$ groups occur at $\delta = 0.46$ and $\delta = 6.8$-$7.7$ ppm, respectively. $\overline{M}_n$ 3960, $\overline{M}_w$ 11800, D 2.97.

EXAMPLE 22

Copolymerization of ETS and EBDS

This polymerization was carried out as described in Example 21C with the following quantities of materials:
Zinc iodide: 1.37 g
Benzaldehyde: 0.44 mL
Methylene chloride: 15 mL
ETS: 6.2 mL
EBDS: 8.4 mL. The mixture of silanes was added to the stirred mixture of zinc iodide, benzaldehyde and methylene chloride during ½ h. The temperature rose to 45° from 22° during the addition. The reaction mixture was allowed to stir at room temperature for several hours after the addition was completed. After filtration, removal of solvent, and drying under vacuum as described in Example 21C, there was obtained 8.15 g (66% yield) of a very viscous substantially colorless material. The $^1$H NMR spectrum (Cl$_3$CD) exhibited, in addition to broad resonances for the CH$_2$ and CH groups of the polymer backbone, resonances for CH$_3$Si—, (CH$_3$)$_3$C— and C$_6$H$_5$—C— group at $\delta = 0.08$ ppm, $\delta = 0.85$ ppm and at $\delta = 7.22$ ppm, respectively. From the relative intensities of these resonances it was determined that the ratio of the two monomers in the polymer = 56 units of EBDS/44 units of ETS, and that there are about 11 monomer units for each benzaldehyde molecule.

EXAMPLE 23

Preparation and polymerization of (ethenyloxy)vinylmethylphenylsilane

All equipment was dried at 135° and allowed to cool under dry nitrogen. All operations were carried out under dry nitrogen.

A. Preparation of lithium ethenoxide
This step was carried out in the manner and on the same scale as described in Example 21A.

B. Reaction of lithium ethenoxide with (chloro)vinylmethylphenylsilane
Following the procedure of Example 21B, 98 mL (101.33 g, 0.555 mole) of (chloro)vinylmethylphenylsilane was added to the cooled lithium ethenoxide solution prepared in Part A. After work-up and distillation as described in Example 21B, there was obtained 65.21 g (68% yield) of (ethenyloxy)vinylmethylphenylsilane distilling at 78.8°/5.0° mm–80.0°/4.8 mm. The $^1$H NMR Spectrum (Cl$_3$CD) exhibited resonances at $\delta = 0.50$ ppm (CH$_3$—Si), ~4.1 and 4.5 ppm (CH$_2$ of vinyl on oxygen), a complicated multiline pattern at $\delta = 5.7$-$6.6$ ppm (vinyl group on silicon and the CH of the vinyl group on oxygen) and at $\delta = 7.2$-$7.7$ ppm (C$_6$H$_5$) with the relative intensities consistent with (ethenyloxy)vinylmethylphenylsilane.

C. Polymerization of (ethenyloxy)vinylmethylphenylsilane

This polymerization was carried out as described in Example 21C with the following quantities of materials:
Zinc iodide: 1.37 g
Benzaldehyde: 0.44 mL
Methylene chloride: 15 mL
(Ethenyloxy)vinylmethylphenylsilane: 22 mL.
The silane was added to the stirred mixture of zinc iodide, benzaldehyde and methylene chloride over a period of 46 minutes. After the addition was completed, the mixture was stirred at room temperature for about 18 h. The mixture was then worked up as described in Example 21C, and there was obtained 18.82 g (~100% yield) of a viscous polymeric residue. The $^1$H NMR spectrum (Cl$_3$CD) exhibited broad resonances at $\delta = 0.30$ ppm (CH$_3$—Si), $\delta = 1.52$ ppm (CH$_2$ in the polymer chain), $\delta = 5.98$ ppm (Si—CH═CH$_2$), and at $\delta = 7.0$-$7.8$ (C$_6$H$_5$), in the expected relative intensities. Since the phenyl proton resonance from the benzaldehyde end group in the polymer is hidden by the large phenyl—Si proton resonance, it is not possible to estimate the number of monomer units per initiator unit.

EXAMPLE 24

Preparation of (ethenyloxy)vinyldimethylsilane

All equipment was dried at 135° and allowed to cool under dry nitrogen. All operations were carried out under dry nitrogen.

A. Reaction of lithium ethenoxide with vinyldimethylchlorosilane

Lithium ethenoxide solution, prepared as in Example 21A, was cooled in an ice bath, and with stirring, 75.6 mL (66.85 g, 0.554 mole) of chloro(vinyldimethyl)silane was added during 49 minutes. The mixture was stirred for an additional hour at ice bath temperature and then at room temperature for several hours. The mixture was filtered, the solid residue was rinsed with anhydrous ether, and the rinsings were added to the filtrate. Distillation of the filtrate through a small spinning band still gave 45.47 g (64% yield) of (ethenyloxy)vinyldimethylsilane distilling at 95.6°-99.6°. The $^1$H NMR spectrum (Cl$_3$CD) exhibited resonances at $\delta = 0.23$ ppm (CH$_3$—Si), 4.11 and 4.42 ppm (CH$_2$ of the vinyl on oxygen) and a complicated multiline pattern at $\delta = 5.62$-$6.50$ ppm (vinyl group on silicon and the CH of the vinyl on oxygen), with relative intensities expected for (ethenyloxy)vinyldimethylsilane. The infrared spectrum (neat) exhibited bands at 3050 cm$^{-1}$ and 3020 cm$^{-1}$ (═CH), 2960 cm$^{-1}$ (sat. CH), 1630 cm$^{-1}$ (O—C═C), 1595 cm$^{-1}$ (Si—C═C), 1250 and 790 cm$^{-1}$ (Si—CH$_3$), and at 1175 cm$^{-1}$ (unsaturated C—O), and is consistent with the vinyldimethylsilyl vinyl ether structure.

B. Polymerization of (ethenyloxy)vinyldimethylsilane

This polymerization was carried out as described in Example 21C with the following quantities of materials:
Zinc iodide: 0.69 g
Benzaldehyde: 0.22 mL
Methylene chloride: 15 mL
(Ethenyloxy)vinyldimethylsilane: 6.81 mL. The silane prepared in Part A was added to the stirred mixture of zinc iodide, benzaldehyde, and methylene chloride over a period of 20 minutes. The polymerization was exothermic from the start and the temperature rose to a maximum of 41.2° from 22.6°. After the addition was completed, the mixture was stirred for about 20 h at room temperature. The mixture was filtered to remove undissolved salt, and the filtrate was distilled on the water pump to remove the solvent. The polymeric residue was further dried for several hours at about 0.5 mm under mild heating (up to about 42°). The polymeric product obtained weighed 3.55 g (62% yield). The $^1$H NMR spectrum (Cl$_3$CD) exhibited resonances consistent with a polymer structure resulting from the benzaldehyde-initiated polymerization of the vinyl ether group, that is, broad resonances for CH$_2$ and CH (adjacent to a silyloxy group) and resonances for CH$_3$—Si and C$_6$H$_5$ groups. In addition, there was a complex multiline pattern at $\delta = 5.3$–$6.5$ ppm which is due to the vinyl group on silicon. This position of the vinyl resonance in the polymer is almost exactly where it occurred in the monomer ($\delta = 5.62$–$6.50$ ppm). The intensity of this vinyl resonance is substantially equal to the combined intensities of the saturated CH and CH$_2$ groups of the polymer, thus indicating that the vinyl group on the silicon did not participate in the polymerization. The infrared spectrum (neat) exhibited bands at 2950 cm$^{-1}$ (saturated CH), 1490 cm$^{-1}$ (aromatic C=C) and 1250 and 780 cm$^{-1}$ (Si—CH$_3$) which are consistent with a polysilyl vinyl ether with methyl and phenyl substituents on the silicon. It also exhibited bands at 3040 and 3000 cm$^{-1}$ (=CH) and at 1590 cm$^{-1}$ (Si—C=C), which confirm the presence of an unpolymerized vinyl group on silicon.

Experiment 1

Attempted Polymerization of EBDS in the Presence of Zinc Bromide Only

The reaction of Example 11 was repeated, except that the terephthaldehyde was omitted. Only about 0.2 g of a comparatively high molecular weight polymer was isolated ($\overline{M}_n$ 7850, $\overline{M}_w$ 17,400), consistent with the expected result in the absence of an effective aldehydic initiator.

BEST MODE FOR CARRYING OUT THE INVENTION

The best mode present contemplated for carrying out the invention is illustrated by Examples 1, 2, 4, 8, 10, 11, 14, 15 and 16.

INDUSTRIAL APPLICABILITY

The invention process provides polymers which can be converted by hydrolysis to vinyl alcohol polymers which are widely used industrially in packaging film, fibers, adhesives, textile sizes, paper making and numerous other applications. Polymers of formula 1, which are "living", may be cast or spun, for example, into film or fiber, from solution, or isolated, processed, and then further polymerized and/or converted into polymers of formula 2 or formula 3. Polymers of formulas 1, 2 and 3 can be hydrolyzed to vinyl alcohol polymers before or after converting into shaped articles, such as films, fibers and compression molded objects.

We claim:

1. Polymer consisting essentially of the polymer of the formula

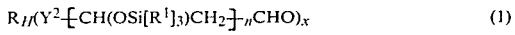   (1)

wherein:

$R_H$ is H or a hydrocarbyl radical of valence x which is alkyl, cycloalkyl, aryl, alkaryl or aralkyl, containing up to 20 carbon atoms, or a polymeric radical containing at least 20 carbon atoms, and which, optionally, contains ether oxygen and/or one or more functional substituents which are unreactive under its preparative polymerizing conditions;

x is an integer and is at least 1;

n is an integer and is at least 5;

$Y^2$ is $Y^3(C[R^4]_2)_y$;

$Y^3$ is a connecting bond or a divalent radical selected from

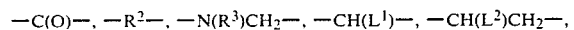

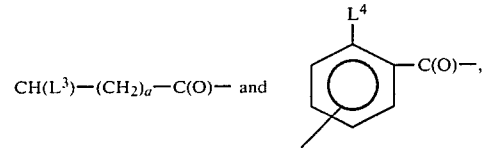

wherein
$R^2$ is C$_{1-10}$ alkylene or C$_{7-20}$ aralkylene, $R^3$ is C$_{1-4}$ alkyl, L$^1$ is —OR$^5$, —OR$^6$OSi[R$^1$]$_3$ or —OSi[R$^1$]$_3$, wherein R$^5$ is C$_{1-4}$ alkyl and R$^6$ is C$_{1-4}$ alkylene, L$^2$ is —OSi[R$^1$]$_3$, L$^3$ is —(CH$_2$)$_b$—C(O)OSi[R$^1$]$_3$, L$^4$ is —C(O)OSi[R$^1$]$_3$, and each of a and b, independently, is 0, 1 or 2;

Y is 0 or 1;

each R$^1$ is independently selected from C$_{1-10}$ alkyl, alkenyl having 2 or 4–10 carbon atoms, and C$_{6-10}$ aryl, alkaryl and aralkyl; and each R$^4$ is independently selected from H, C$_{1-10}$ alkyl and C$_{6-10}$ aryl, aralkyl and alkaryl.

2. Polymer of claim 1 wherein each R$^1$ is alkyl and the total number of carbon atoms in all of the R$^1$ groups is at least six.

3. Polymer of claim 2 wherein at least one R$^1$ group is branched alkyl.

4. Polymer of claim 3 wherein one R$^1$ group is t-butyl and two R$^1$ groups are CH$_3$.

5. Polymer of claim 2 wherein at least one R$^4$ is H or alkyl.

6. Polymer of claim 5 wherein alkyl is methyl.

7. Polymer of claim 2 wherein each R$^4$ is H.

8. Polymer of claim 1 wherein x is 1 to 10.

9. Polymer of claim 8 wherein x is 1.

10. Polymer of claim 1 wherein Y$^3$ is —CH(L$^1$)—, —C(O)—, —R$^2$—, or a connecting bond.

11. Polymer of claim 1 wherein R$_H$ is a nonpolymeric radical.

12. Polymer consisting essentially of the polymer of the formula

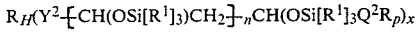

wherein:
R$_H$ is H or a hydrocarbyl radical of valence x which is alkyl, cycloalkyl, aryl, alkaryl or aralkyl, containing up to 20 carbon atoms, or a polymeric radical containing at least 20 carbon atoms, and which, optionally, contains ether oxygen and/or one or more functional substituents which are unreactive under its preparative polymerizing conditions;
x is an integer and is at least 1;
n is an integer and is at least 5;
Y$^2$ is Y$^3$(C[R$^4$]$_2$)$_y$;
Y$^3$ is selected from a connecting bond and a divalent radical selected from

—C(O)—, —R$^2$—, —N(R$^3$)CH$_2$—, —CH(L$^1$)—, —CH(L$^2$)CH$_2$—,

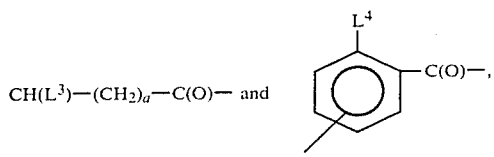

wherein
R$^2$ is C$_{1-10}$ alkylene or C$_{7-20}$ aralkylene, R$^3$ is C$_{1-4}$ alkyl, L$^1$ is —OR$^5$, —OR$^6$OSi[R$^1$]$_3$ or —OSi[R$^1$]$_3$, wherein R$^5$ is C$_{1-4}$ alkyl and R$^6$ is C$_{1-4}$ alkylene, L$^2$ is —OSi[R$^1$]$_3$, L$^3$ is —(CH$_2$)$_b$—C(O)OSi[R$^1$]$_3$, L$^4$ is —C(O)OSi[R$^1$]$_3$, and each of a and b, indepedently, is 0, 1 or 2;
y is 0 or 1;
each R$^4$ is independently selected from H, C$_{1-10}$ alkyl and C$_{6-10}$ aryl, aralkyl and alkaryl;
Q$^2$ is a keto or cyano group-containing divalent radical selected from

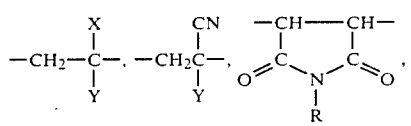

and mixtures thereof;
R$_p$ is H, C$_{1-4}$ alkyl, or a methacrylic and/or acrylic polymer radical;
X is —CN, —CH=CHC(O)X' or —C(O)X';
Y is —H, —CH$_3$, —CN or —CO$_2$R, provided, however, when X is CH=CHC(O)X', Y is —H or —CH$_3$;
X' is —OSI(R$^1$)$_3$, —R, —OR or —NR'R''; each R$^1$ is independently selected from C$_{1-10}$ alkyl, alkenyl having 2 or 4–10 carbon atoms, and C$_{6-10}$ aryl, alkaryl and aralkyl;
R is C$_{1-20}$ alkyl, alkenyl or alkadienyl; C$_{6-20}$ cycloalkyl aryl, alkaryl or aralkyl; any of said groups optionally containing one or more ether oxygen atoms within aliphatic segments thereof; and any of all the aforesaid groups optionally containing one or more functional substituents that are unreactive under its preparative polymerizing conditions; and each of R' and R'' is independently selected from C$_{1-4}$ alkyl.

13. Polymer of claim 12 wherein each R$^1$ is alkyl and the total number of carbon atoms in all of the R$^1$ groups is at least six.

14. Polymer of claim 13, wherein at least one R$^1$ group is branched alkyl.

15. Polymer of claim 14 wherein one R$^1$ group is t-butyl and two R$^1$ groups are CH$_3$.

16. Polymer of claim 13 wherein at least one R$^4$ is H or alkyl.

17. Polymer of claim 16 wherein alkyl is methyl.

18. Polymer of claim 13 wherein each R$^4$ is H.

19. Polymer of claim 12 wherein x is 1 to 10.

20. Polymer of claim 19 wherein x is 1.

21. Polymer of claim 12 wherein Y$^3$ is —CH(L$^1$)—, —C(O)—, —R$^2$— or a connecting bond.

22. Polymer of claim 12 wherein R$_p$ is a polymeric radical of a methacrylic and/or acrylic living polymer.

23. Polymer of claim 22 wherein R$_p$ is a methacrylic polymeric radical.

24. Polymer of claim 12 wherein R$_H$ is a nonpolymeric radical.

25. Polymer consisting essentially of the polymer of the formula R$_H$(Y$^2$—[CH(OSi[R$^1$]$_3$)CH$_2$]$_n$X$^3$)$_x$
wherein:
R$_H$ is H or a hydrocarbyl radical of valence x which is alkyl, cycloalkyl, aryl, alkaryl or aralkyl, containing up to 20 carbon atoms, or a polymeric radical containing at least 20 carbon atoms, and which, optionally, contains ether oxygen and/or one or more functional substituents which are unreactive under its preparative polymerizing conditions;
x is an integer and is at least 1;
n is an integer and is at least 5;
Y$^2$ is Y$^3$(C[R$^4$]$_2$)$_y$;
Y$^3$ is a connecting bond or a divalent radical selected from

—C(O)—, —R$^2$—, —N(R$^3$)CH$_2$—, —CH(L$^1$)—, —CH(L$^2$)CH$_2$—,

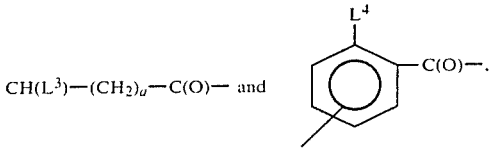

wherein
R$^2$ is C$_{1-10}$ alkylene or C$_{7-20}$ aralkylene, R$^3$ is C$_{1-4}$ alkyl, L$^1$ is —OR$^5$, —OR$^6$OSi[R$^1$]$_3$ or —OSi[R$^1$]$_3$, wherein R$^5$ is C$_{1-4}$ alkyl and R$^6$ is C$_{1-4}$ alkylene, L$^2$ is —OSi[R$^1$]$_3$, L$^3$ is —(CH$_2$)$_b$—C(O)OSi[R$^1$]$_3$, L$^4$ is —C(O)OSi[R$^1$]$_3$, each of a and b, independently is 0, 1 or 2;
y is 0 or 1;
each R$^1$ is independently selected from C$_{1-10}$ alkyl, alkenyl having 2 or 4–10 carbon atoms, and C$_{6-10}$ aryl, alkaryl and aralkyl;
each R$^4$ is independently selected from H, C$_{1-10}$ alkyl and C$_{6-10}$ aryl, aralkyl and alkaryl; and
X$^3$ is —CH$_2$OH, —CO$_2$M or —Q$^3$R$_p^1$ wherein R$_p^1$ is defined as for R$_H$ and Q$^3$ is a di- or trivalent radical selected from

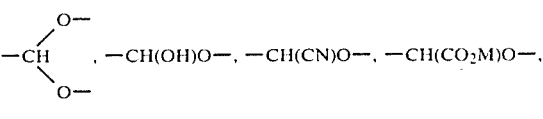

-continued $$-CH=NC(NH)NH-, -CH=NC(O)NHNH-, -\underset{|}{C}HOG$$

wherein
M is H, an alkali metal or ammonium and G is the halometal portion of a Grignard reagent.

26. Polymer of claim 25 wherein $R_H$ is a nonpolymeric radical.

27. Polymer of claim 25 wherein at least one $R^4$ is H or alkyl.

28. Polymer of claim 27 wherein alkyl is methyl.

29. Polymer of claim 25 wherein each $R^4$ is H.

30. Process of preparing the polymer of claim 1, the process comprising contacting an ethenyloxysilane monomer, or mixture of such monomers, of the formula $CH_2=CHOSi(R^1)_3$, under polymerizing conditions, with (i) an initiator which is an aldehyde of the formula $R_H(Y^2CHO)_x$ or a precursor compound thereof of the formual $R_H(Y^1X^1)_x$; and (ii) a catalyst which is a suitable Lewis acid or a source of bifluoride ion, wherein, in the formulas, $R^1$, $R_H$, $Y^2$, and x are as defined in claim 1;

$Y^1$ is a connecting bond or a divalent radical selected from
—C(O)—, —$R^2$—, —CH[OSi($R^1$)$_3$]—, —CH(O$R^5$)— and —N$^\oplus$($R^3$)=CH$_2$,
wherein
$R^1$ is as defined in claim 1, $R^2$ is $C_{1-10}$ alkylene or $C_{7-20}$ aralkylene, $R^3$ is $C_{1-4}$ alkyl, and $R^5$ is $C_{1-4}$ alkyl;
$X^1$ is —OH, —Cl, —Br, —H, —$R^5$, —O$R^5$, Cl$^\ominus$, Br$^\ominus$, I$^\ominus$, O$^\ominus R^5$, O$^\ominus$CO$R^5$, or $CH_3C_6H_4SO_3^\ominus$, wherein $R^5$ is $C_{1-4}$ alkyl; and
$Y^1$ and $X^1$ taken together is $$-CH\underset{O}{\overset{}{\diagdown\diagup}}CH_2, \quad -CH\underset{|}{\overset{|}{\phantom{X}}}-O, \quad \text{or} \quad -R^8-C\underset{\diagdown}{\overset{\diagup O}{\phantom{X}}}O,$$
$$\phantom{XXXXXXX}O-R^6 \quad -R^7-C\underset{\diagdown O}{\overset{\diagup}{\phantom{X}}}$$

wherein $R^6$ is $C_{1-4}$ alkylene, $R^8$ is a connecting bond or $C_{1-10}$ alkylene, and $R^7$ is $C_{1-10}$ alkyl or $C_{6-10}$ aryl, or
$R^8$ and $R^7$ taken together is $$-CH\underset{(CH_2)_b}{\overset{(CH_2)_a}{|}} \quad \text{or} \quad \bigcirc,$$

wherein each of a and b taken independently is 0, 1 or 2;
with the provisos that:
(i) when $Y^1$ is a connecting bond, $X^1$ is —OH;
(ii) when $Y^1$ is —C(O)—, $X^1$ is —Cl, —Br, —H, or —$R^5$;
(iii) when $Y^1$ is —$R^2$—, $X^1$ is —Cl or —Br; and
(iv) when $Y^1$ is —N$^\oplus$($R^3$)=CH$_2$, $X^1$ is O$^\ominus R^5$, O$^\ominus$CO$R^5$, Cl$^\ominus$, Br$^\ominus$, I$^\ominus$, or $CH_3C_6H_4SO_3^\ominus$.

31. Process of claim 30 wherein each $R^1$ is alkyl and the total number of carbon atoms in all of the $R^1$ groups is at least six.

32. Process of claim 31 wherein at least one $R^1$ group is branched alkyl.

33. Process of claim 32 wherein one $R^1$ group is t-butyl and two $R^1$ groups are $CH_3$.

34. Process of claim 31 wherein Y is 1 and at least one $R^4$ is H or alkyl.

35. Process of claim 34 wherein alkyl is methyl.

36. Process of claim 31 wherein y is 1 and each $R^4$ is H.

37. Process of claim 31 wherein y is 0.

38. Process of claim 30 wherein $Y^3$ is —CH($L^1$)—, —C(O)—, $R^2$, or a connecting bond.

39. Process of claim 30 wherein x is 1 to 10.

40. Process of claim 39 wherein x is 1.

41. Process of claim 30 wherein $R_H$ is a nonpolymeric radical.

42. Process of claim 30 wherein the aldehyde initiator wherein y is 1 is produced in-situ by contacting an ethenyloxysilane of the formula $C[R^4]_2=CHOSi[R^1]_3$, under polymerizing conditions, with the precursor compound wherein:
each $R^1$ is independently selected from $C_{1-10}$ alkyl, alkenyl having 2 or 4–10 carbon atoms, and $C_{6-10}$ aryl, alkaryl and aralkyl; and
$R^4$ is independently selected from H, $C_{1-10}$ alkyl and $C_{6-10}$ aryl, aralkyl and alkaryl.

43. Process of preparing the polymer of claim 12 by reacting the polymer of the formula $R_H(Y^2\text{-}\{CH(OSi[R^1]_3)CH_2\}_n CHO)_x$ wherein $R_H$, $Y^2$, $R^1$, n and x are as defined in claim 12, in the presence of a suitable Lewis acid or a source of bifluoride, fluoride, difluorotrimethylsilicate, cyano, or azido ions, with the compound of the formula $(R^1)_3SiQ^1R_p$ wherein $Q^1$ is a divalent radical selected from $$-CH_2-\underset{Y}{\overset{X}{\underset{|}{C}}}-, \quad -CH_2-\underset{Y}{\overset{}{C}}=C=CN-,$$

$$-CH_2-\underset{Y}{\overset{X'}{C}}=CO-, \quad -CH_2-\underset{Y}{\overset{X'}{C}}=CH-CH=CO-,$$

$$-CH-CH- \quad -CH-CH \\ \overset{}{\underset{O=C}{|}}\underset{N}{\phantom{X}}\underset{C=O}{|}, \underset{O=C}{|}\underset{N}{\phantom{X}}\underset{CO-}{\overset{||}{|}} \\ \phantom{XXX}R \phantom{XXXXXXXXX} R$$

and mixtures thereof, and R, $R^1$, $R_p$, X, Y and X' are as defined in claim 12.

44. Process of claim 43 wherein at least one $R^4$ is H or alkyl.

45. Process of claim 44 wherein alkyl is methyl.

46. Process of claim 43 wherein each $R^4$ is H.

47. Process of claim 43 wherein $R_p$ is a polymeric radical of a methacrylic and/or acrylic living polymer.

48. Process of claim 47 wherein $R_p$ is a methacrylic polymeric radical.

49. Process of claim 43 wherein $R_H$ is a nonpolymeric radical.

50. Process wherein the polymer consisting essentially of the polymer of the formula $R_H(Y^2\text{-}\{CH(OSi[R^1]_3)CH_2\}_n CHO)_x$ wherein $R_H$, $Y^2$, $R^1$, n and x are as defined in claim 43 is reacted with an aldehyde-active reagent other than the compound of the formula $(R^1)_3SiQ^1R_p$ of claim 43.

51. Process of claim 50 wherein the aldehyde-active reagent is selected from an oxidizing agent, a reducing agent, and an aldehyde-active compound of the formula $R_p{}^1X^2$
wherein
$R_p{}^1$ is as defined for $R_H$; and
$X^2$ is a monovalent radical selected from —OH, —CN, —SO$_3$M, —NH$_2$, —ONH$_2$, —NHNH$_2$, —NHC(O)NH$_2$, —NHC(NH)NH$_2$, —NHNHC(O)NH$_2$, and —G wherein G is the halometal portion of a Grignard reagent and M is H, an alkali metal or ammonium.

52. Process of claim 50 wherein at least one $R^4$ is H or alkyl.

53. Process of claim 52 wherein alkyl is methyl.

54. Process of claim 50 wherein each $R^4$ is H.

55. Process of claim 50 wherein $R_H$ is a nonpolymeric radical.

56. Process of polymerizing an ethenyloxysilane monomer, or mixture of such monomers, of the formula $CH_2=CHOSi(R^1)_3$, by contacting the monomer or mixture of monomers under polymerizing conditions with (i) an initiator which is an aldehyde of the formula $R_H(Y^2CHO)_x$ or a precursor compound thereof of the formula $R_H(Y^1X^1)_x$ and (ii) a catalyst which is a suitable Lewis acid or a source of bifluoride ion, wherein, in the formulas:
$R_H$ is H or a hydrocarbyl radical or valence x which is alkyl, cycloalkyl, aryl, alkaryl or aralkyl, containing up to 20 carbon atoms, or a polymeric radical containing at least 20 carbon atoms, and which, optionally, contains ether oxygen and/or one or more functional substituents which are unreactive under its preparative polymerizing conditions;
$Y^2$ is $Y^3$ $(C[R^4]_2)_y$;
$Y^3$ is a connecting bond or a divalent radical selected from

—C(O)—, —R$^2$—, —N(R$^3$)CH$_2$—, —CH(L$^1$)—, —CH(L$^2$)CH$_2$—,

CH(L$^3$)—(CH$_2$)$_a$—C(O)— and 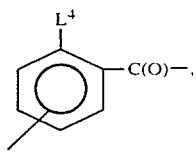

wherein
$R^2$ is $C_{1-10}$ alkylene or $C_{7-20}$ aralkylene, $R^3$ is $C_{1-4}$ alkyl, $L^1$ is —OR$^5$, —OR$^6$OSi[R$^1$]$_3$ or —OSi[R$^1$]$_3$, wherein $R^5$ is $C_{1-4}$ alkyl and $R^6$ is $C_{1-4}$ alkylene, $L^2$ is —OSi[R$^1$]$_3$, $L^3$ is —(CH$_2$)$_b$—C(O)OSi[R$^1$]$_3$, $L^4$ is —C(O)OSi[R$^1$]$_3$, and each of a and b, independently, is 0, 1 or 2;
$Y^1$ is a connecting bond or a divalent radical selected from
—C(O)—, —R$^2$—, —CH[OSi(R$^1$)$_3$]—, —CH(OR$^5$)— and —N⊕(R$^3$)=CH$_2$,
wherein
$R^1$ is as defined below, $R^2$ is $C_{1-10}$ alkylene or $C_{7-20}$ aralkylene, $R^3$ is $C_{1-4}$ alkyl, and $R^5$ is $C_{1-4}$ alkyl;
$X^1$ is —OH, —Cl, —Br, —H, —R$^5$, —OR$^5$, Cl⊖, Br⊖, I⊖, O⊖R$^5$, O⊖COR$^5$, or CH$_3$C$_6$H$_4$SO$_3$⊖, wherein $R^5$ is $C_{1-4}$ alkyl;
$Y^1$ and $X^1$ taken together is

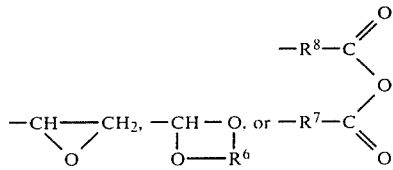

wherein $R^6$ is $C_{1-4}$ alkylene, $R^8$ is a a connecting bond or $C_{1-10}$ alkylene, and $R^7$ is $C_{1-10}$ alkyl or $C_{6-10}$ aryl, or $R^8$ and $R^7$ taken together is

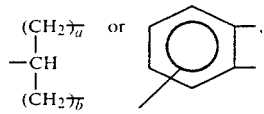

wherein each of a and b taken independently is 0, 1 or 2;
with the provisos that:
(i) when $Y^1$ is a connecting bond, $X^1$ is —OH;
(ii) when $Y^1$ is —C(O)—, $X^1$ is —Cl, —Br, —H, or —R$^5$;
(iii) when $Y^1$ is —R$^2$—, $X^1$ is —Cl or —Br; and
(iv) when $Y^1$ is —N⊕(R$^3$)=CH$_2$, $X^1$ is O⊖R$^5$, O⊖COR$^5$, Cl⊖, Br⊖, I⊖, or CH$_3$C$_6$H$_4$SO$_3$⊖;
each $R^1$ is independently selected from $C_{1-10}$ alkyl, alkenyl having 2 or 4–10 carbon atoms, and $C_{6-10}$ aryl, alkaryl and aralkyl;
each $R^4$ is independently selected from H, $C_{1-10}$ alkyl and $C_{6-10}$ aryl, aralkyl and alkaryl;
x is an integer and is at least 1; and
y is 0 or 1.

57. Polymer prepared by the process of claim 56.

58. Polymer prepared by hydrolyzing the polymer of claim 1.

59. Polymer prepared by hydrolyzing the polymer of claim 12.

60. Polymer prepared by hydrolyzing the polymer of claim 25.

61. Polymer prepared by hydrolyzing the polymer of claim 57.

* * * * *

UNITED STATES PATENT AND TRADEMARK OFFICE
CERTIFICATE OF CORRECTION

PATENT NO. : 4,544,724
DATED : October 1, 1985
INVENTOR(S) : Dotsevi Yao Sogah and Owen Wright Webster It is certified that error appears in the above—identified patent and that said Letters Patent is hereby corrected as shown below:

Column 22, line 42, "Y" should be --y--.

Column 23, line 31, "indepedently" should be --independently--.

Column 25, line 23, "formual" should be --formula--.

Column 26, line 8, "Y" should be --y--.

Column 26, line 28, before "$R^4$" insert --each--.

Signed and Sealed this

Fourteenth Day of January 1986

[SEAL]

Attest:

Attesting Officer

DONALD J. QUIGG

Commissioner of Patents and Trademarks